Figure 1:
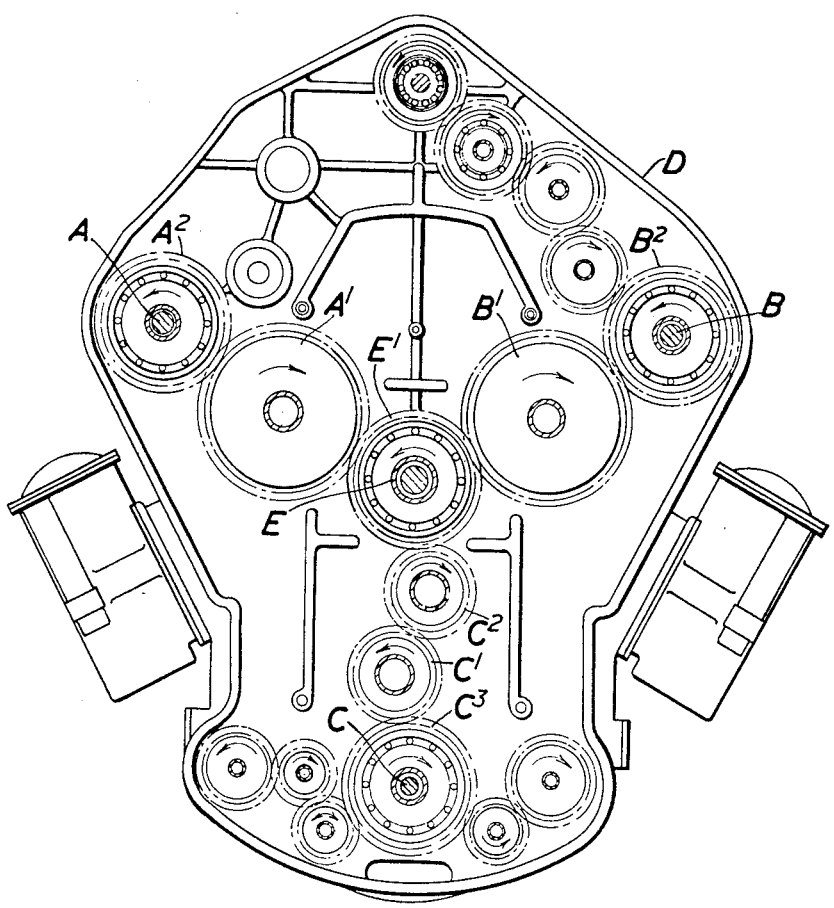

Feb. 28, 1956  G. H. MURRAY  2,736,819
ELECTRIC GENERATING UNIT
Filed March 9, 1955  3 Sheets-Sheet 1

INVENTOR
GEORGE H. MURRAY

BY Watson, Cole, Grindle + Watson
ATTORNEYS

Feb. 28, 1956

G. H. MURRAY 2,736,819

ELECTRIC GENERATING UNIT

Filed March 9, 1955

3 Sheets-Sheet 3

INVENTOR
GEORGE H. MURRAY

ATTORNEY

United States Patent Office 2,736,819
Patented Feb. 28, 1956

2,736,819

ELECTRIC GENERATING UNIT

George Hamilton Murray, Pinner, England, assignor to D. Napier & Son Limited, London, England, a company of Great Britain Application March 9, 1955, Serial No. 501,955

Claims priority, application Great Britain March 15, 1954

12 Claims. (Cl. 290—1)

This invention relates to electric generating units of the kind comprising an internal combustion engine having an output shaft which is coupled to the armature shaft of an electric generator and has for its object to provide an arrangement which will be compact, provide for a desired degree of flexibility between the engine crankshaft or crankshafts and the armature shaft and be generally suited to its purpose.

An electric generating unit of the kind referred to according to the present invention comprises an internal combustion engine having an output shaft driven from the crankshaft or crankshafts of the engine through transmission gearing within a gear casing rigid with and forming an integral part of the engine, and an electric generator which in itself has no supporting bearing for the end of its armature shaft which is to be connected to the engine output shaft, while the engine includes a stubshaft which is supported in a self-aligning bearing in the gear casing, such bearing being approximately coaxial with the output shaft, and is rigidly connected to the adjacent end of the armature shaft so as to support such armature shaft and have its alignment determined by it, and a direct connection between the output shaft and the stubshaft permitting limited misalignment between them.

By a direct connection between the output shaft and the stubshaft is to be understood connection by a part or parts which extend between and rotate substantially as a unit with the stubshaft and the output shaft.

Preferably the direct connection between the output shaft and the stub shaft is in the form of a quill shaft connected at one end to the output shaft and at its other end to the stubshaft by a coupling permitting the required lack of alignment.

Further, in order to provide a compact arrangement while employing a quill shaft of a desired flexibility, the output shaft and the stubshaft are both preferably hollow and the quill shaft extends through them and is connected at one of its ends to the end of the output shaft remote from the stub shaft and at its other end to the end of the stubshaft remote from the output shaft.

In one arrangement each of the connections respectively between the quill shaft and the output shaft and the quill shaft and the stubshaft comprises a dog type coupling of the kind in which the interengaging dog teeth extend radially and permit limited lack of alignment between the two parts of the connection.

In an alternative arrangement, while one end of the quill shaft is connected to the stub shaft by a dog type connection the other end of the quill shaft is connected to the output shaft by a Bibby type coupling.

Again in a still further arrangement the quill shaft may be connected to the output shaft through a speed responsive centrifugal governor responsive to the speed of the output shaft so that it remains disengaged at low output shaft speeds and automatically and progressively comes into engagement as the speed of the output shaft increases above a predetermined value. Thus the output shaft is automatically relieved of the inertia of the generator armature during starting of the internal combustion engine.

Figure 2:
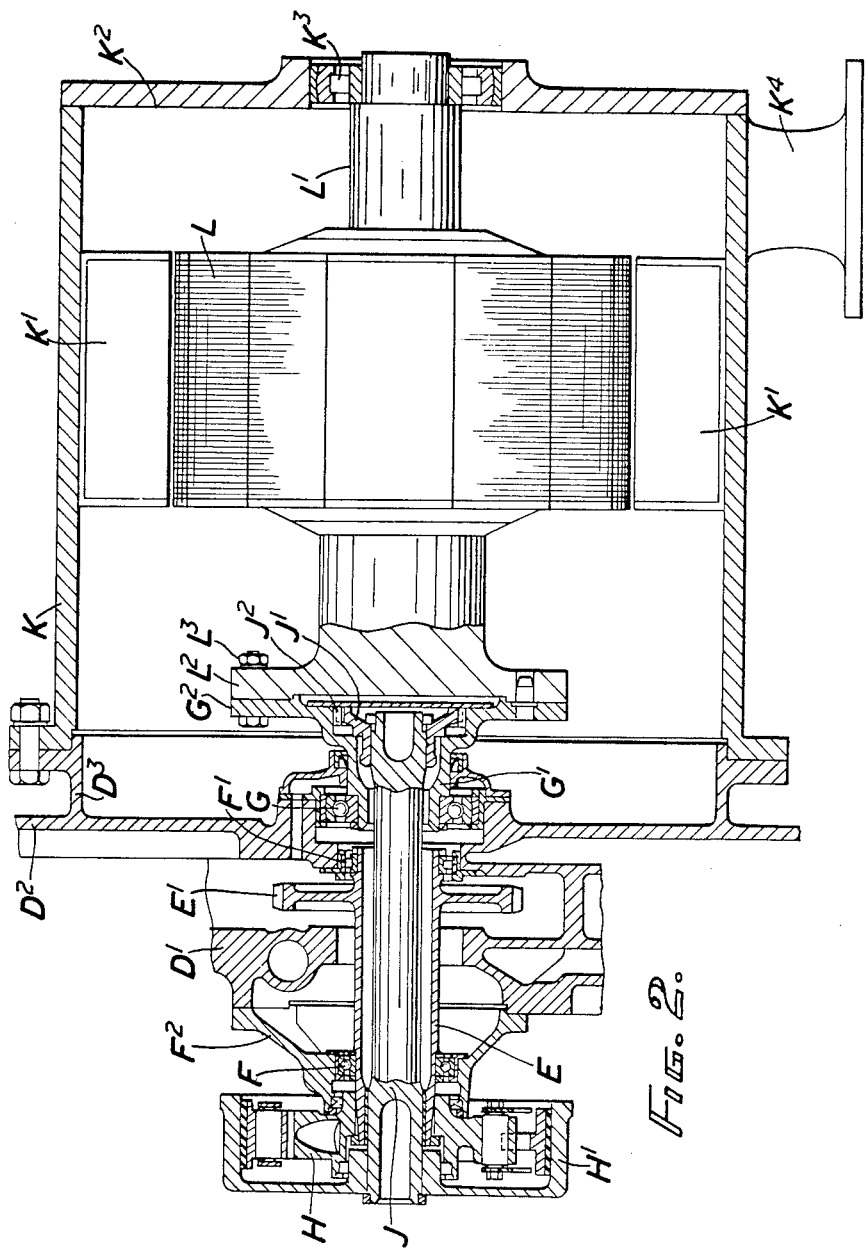
Figure 3:
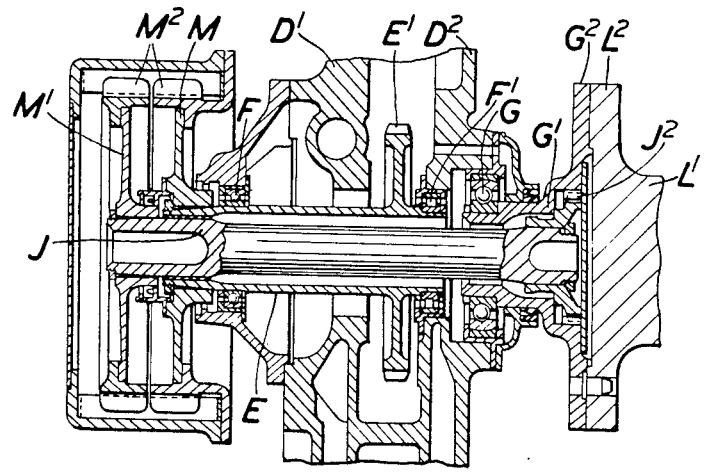
Figure 4:
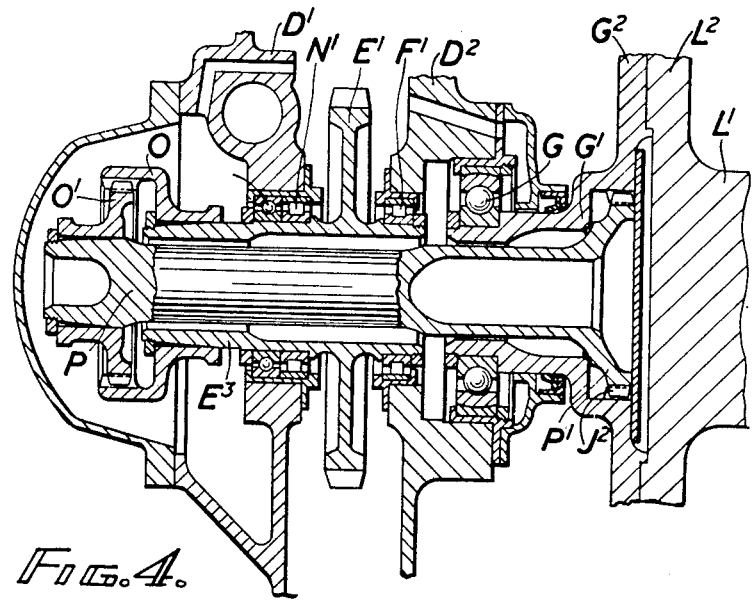

One construction of electric generating unit of the kind referred to according to the invention is shown in the accompanying drawings, in which:

Figure 1 is a rear elevation of the internal combustion engine forming part of the unit with the rear cover removed to show the lay-out of transmission gearing, Figure 2 is a cross-section on the line 1—1 of Figure 1 showing the generator of the unit somewhat diagrammatically and the manner in which it is combined with the internal combustion engine, Figure 3 is a similar view to Figure 2 omitting for the sake of compactness the greater part of the generator and showing a modification of the arrangement shown in Figure 2, and Figure 4 is a similar view to Figure 3 on a slightly enlarged scale showing a further modification.

In the form of power unit illustrated in Figures 1 and 2, the engine is of the known kind comprising three crankshafts A, B and C whose axes lie at the apices of an equilateral triangle supported in a casing generally indicated at D, the engine including three rows of open-ended cylinders the axes of which lie respectively in the plane in which the axes of the crankshafts A and B lie, the plane in which the axes of the crankshafts B and C lie, and the plane in which the axes of the crankshafts A and C lie, while each of the crankshafts is coupled by the usual connecting rods to two sets of pistons which lie and reciprocate respectively in the adjacent end of the cylinders in the two rows associated with that crankshaft. There are thus two pistons in each cylinder which during operation move towards and away from one another. Since the type of engine referred to is known and in itself forms no part of the invention it will not be further described.

In such engines the three crankshafts are connected to one another and to an output shaft by gearing, and in the arrangement shown the output shaft is shown at E and the crankshafts are connected to it by gearing comprising intermediate gears $A^1$ and $B^1$ meshing respectively with gears $A^2$ and $B^2$ on the crankshafts A and B and a gear wheel $E^1$ on the output shaft E and intermediate gears $C^1$, $C^2$ interposed between a gear wheel $C^3$ on the crankshaft C and the gear wheel $E^1$ on the output shaft E. Thus the crankshafts A and B rotate in the same direction as one another but in the opposite direction to the crankshaft C in known manner.

In the arrangement shown in Figure 2 the output shaft E is hollow and is supported in bearings F, $F^1$ carried respectively in a plate $F^2$ supported from a rear wall $D^1$ integral with the casing D and a cover plate $D^2$ which is secured to the casing D and arranged to enclose the gearing shown in Figure 1 and thus forms the rear cover plate of the engine casing D. Supported in a bearing G in the cover plate $D^2$ so as to lie approximately coaxially with the output shaft E is a stub shaft $G^1$ having formed thereon a supporting flange $G^2$, the bearing G being of a known kind allowing for a limited degree of self-alignment. The shaft E is hollow as shown and has rigidly secured to its forward end the inner member H of a centrifugal clutch of well known type which will therefore not be further described. The outer member $H^1$ of the centrifugal clutch is rigidly connected to the front end of a quill shaft J passing through the shaft E and carrying at its rear end the inner member $J^1$ of a radial dog type coupling, the outer member of which is constituted by teeth $J^2$ formed on the interior of the flange $G^2$ as shown so that the shaft E is connected to the flange $G^2$ through the centrifugal clutch H, $H^1$ and the quill shaft J. Formed on the cover plate $D^2$ is a large diameter flange $D^3$ to which is rigidly secured the forward end of the casing K of an electric generator, which casing carries the field magnets K¹ of the generator and has a rear wall K² in which is mounted a roller bearing K³. The armature L of the generator is carried upon an armature shaft L¹ one end of which is supported by the roller bearing K³ while its other end is provided with a flange L² which is rigidly secured to the flange G² by bolts L³ so that the armature L is supported at one end only by the bearing K³ carried by the casing K of the electric generator and is supported at its other end entirely through the stubshaft G¹ by the bearing G in the engine casing, the casing K and hence the field magnets L of the generator being similarly supported at one end entirely by the flange D³ on the engine casing D while being supported at its other end by a suitable supporting "foot" as indicated at K⁴.

In the modified arrangement shown in Figure 3 the form and general arrangement of the generator would be as shown in Figure 2 and the general arrangement of the shaft E, stubshaft G¹ and quill shaft J is as shown in Figure 2 and will not therefore be further described with reference to Figure 3. In the construction shown in Figure 3, however, the front end of the shaft E, instead of being connected to the inner member of a centrifugal clutch H is rigidly connected to the driving part M of a Bibby type coupling the driven part M¹ of which is rigidly connected to the front end of the quill shaft J, the two parts M, M¹ of this coupling being, as will be understood, united by the usual zig-zag resilient element the parts of which extend between the teeth M² of the two parts of the coupling.

In the modification shown in Figure 4 the construction and arrangement of the generator and of the stubshaft G would be the same as in the arrangement shown in Figure 2 and will not therefore be further described with reference to Figure 4. In the construction shown in Figure 4, however, instead of the relatively long driven shaft E a somewhat shorter driven shaft E³ carrying the gear wheel E¹ is provided and is supported in closely spaced bearings respectively in the cover plate D² and in the wall D¹, one of these bearings F¹ being similar and similarly arranged to the bearing F¹ in the construction shown in Figure 2 while the other is a combined roller and ball bearing assembly N¹ supported directly in the wall D¹. Moreover in this construction the front end of the shaft E³ has rigidly connected to it the outer member O of a radial dog type coupling the inner member O¹ of which is rigidly connected to the adjacent end of a quill shaft P which has a somewhat different construction from the quill shaft J and carries at its rear end the inner member P¹ of a radial dog type coupling the teeth of which engage the teeth J² constituting the outer member of this coupling formed on the flange G².

What I claim as my invention and desire to secure by Letters Patent is:

1. An electric generating unit comprising an internal combustion engine including at least one crankshaft, an output shaft, transmission gearing connecting the crankshaft to the output shaft, a gear casing rigid with and forming an integral part of the engine and enclosing said transmission gearing, a stubshaft projecting from the casing, a self-aligning bearing by which said stubshaft is supported in said casing and a direct connection between said output shaft and said stubshaft permitting limited mis-alignment between them, and an electric generator including an armature shaft, one end of which is rigidly connected to and supported solely by the stubshaft and a bearing supporting the other end of said armature shaft.

2. An electric generating unit as claimed in claim 1, in which the electric generator includes a generator casing which is rigidly connected to and supported at one end solely from the engine gear casing.

3. An electric generating unit as claimed in claim 2, in which the direct connection between said output shaft and said stubshaft comprises a quill shaft, a connection between one end of said quill shaft and the output shaft, and a connection between the other end of said quill shaft and said stubshaft permitting limited lack of alignment between said other end of said quill shaft and said stubshaft.

4. An electric generating unit as claimed in claim 3, wherein said output shaft and said stubshaft are both hollow and said quill shaft extends through them, the connection between said output shaft and said quill shaft being at the end of said output shaft remote from said stubshaft while the connection between said quill shaft and said stubshaft is situated at the end of said stubshaft remote from said output shaft.

5. An electric generating unit as claimed in claim 4, in which the connection between said quill shaft and said output shaft comprises a Bibby coupling.

6. An electric generating unit as claimed in claim 4, in which the connection between said quill shaft and said output shaft comprises a speed-responsive centrifugal clutch responsive to the speed of the output shaft.

7. An electric generating unit as claimed in claim 1, in which the direct connection between said output shaft and said stub shaft comprises a quill shaft, a connection between one end of said quill shaft and said output shaft, and a connection between the other end of said quill shaft and said stubshaft permitting limited lack of alignment between said quill shaft and said stubshaft.

8. An electric generating unit as claimed in claim 7, in which said output shaft and said stubshaft are both hollow and said quill shaft extends through them, the connection between said output shaft and said quill shaft being at the end of said output shaft remote from said stubshaft while the connection between said quill shaft and said stubshaft is situated at the end of said stubshaft remote from said output shaft.

9. An electric generating unit as claimed in claim 8, in which the connection between said quill shaft and said output shaft comprises a Bibby coupling.

10. An electric generating unit as claimed in claim 8, in which the connection between said quill shaft and said output shaft comprises a speed-responsive centrifugal clutch responsive to the speed of said output shaft.

11. An electric generating unit as claimed in claim 1, in which the direct connection between said output shaft and said stubshaft comprises a quill shaft, a Bibby type coupling connecting one end of said quill shaft to said output shaft, and a connection between the other end of said quill shaft and said stubshaft permitting limited lack of alignment between said stubshaft and said quill shaft.

12. An electric generating unit as claimed in claim 1, in which the direct connection between said output shaft and said stubshaft comprises a quill shaft, a speed-responsive centrifugal clutch responsive to the speed of said output shaft and connecting said output shaft to one end of the quill shaft, and a connection between the other end of said quill shaft and said stubshaft permitting limited lack of alignment between said output shaft and said quill shaft.

References Cited in the file of this patent
UNITED STATES PATENTS

| | | |
|---|---|---|
| 1,171,948 | Hassler | Feb. 15, 1916 |
| 2,483,305 | Vollenweider | Sept. 27, 1949 |
| 2,668,914 | Uher | Feb. 9, 1954 |
| 2,715,685 | Brown | Aug. 16, 1955 |